Patented May 7, 1929.

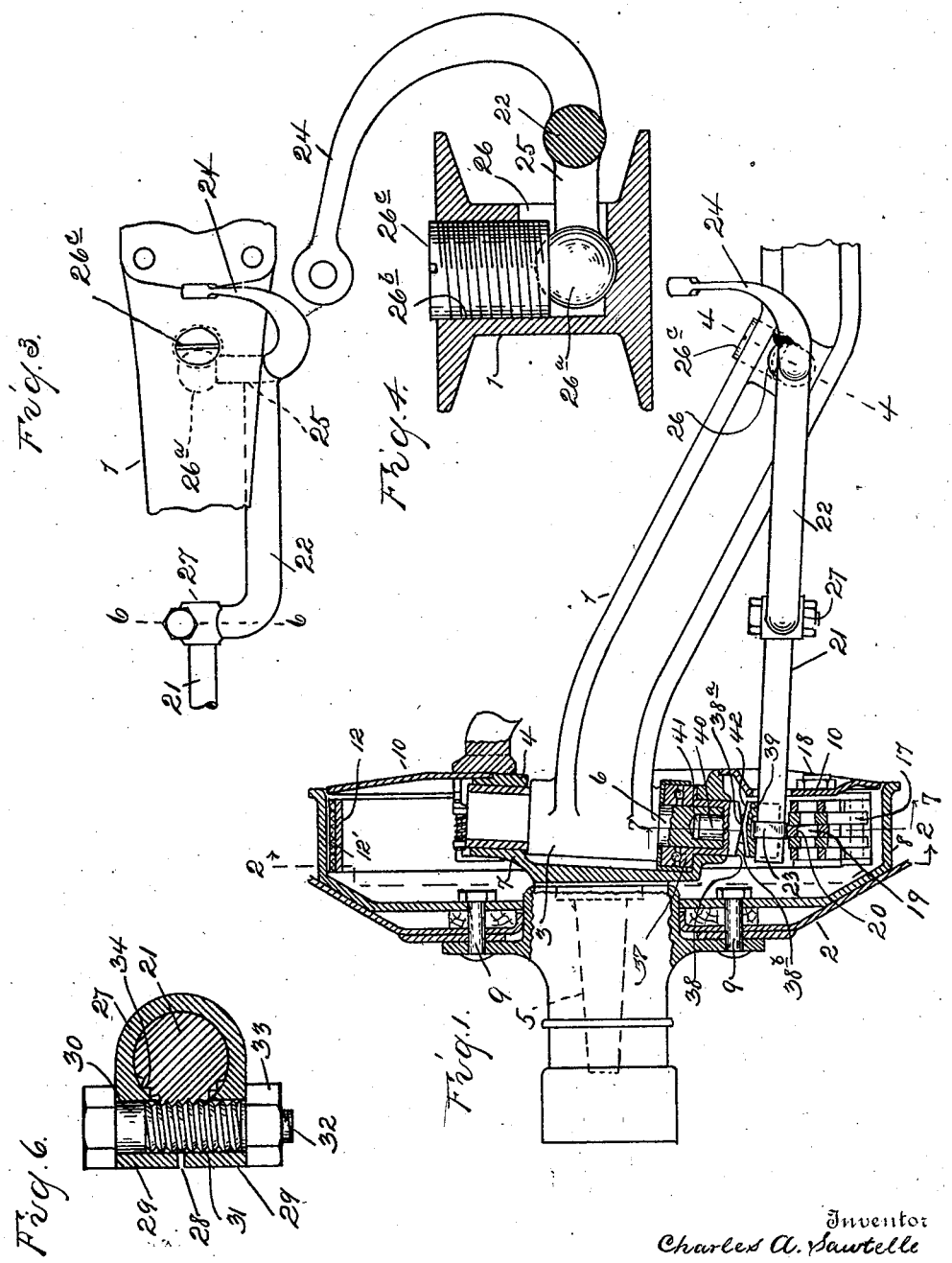

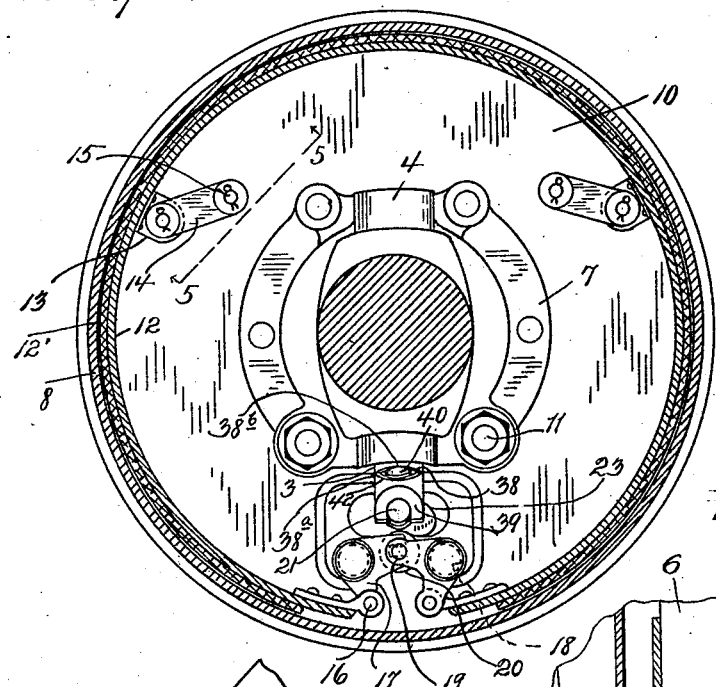
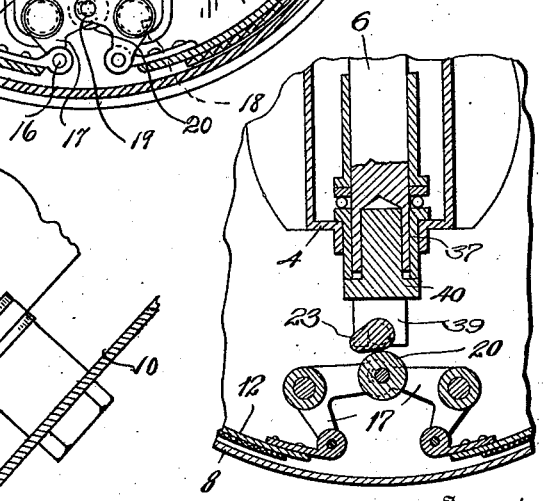
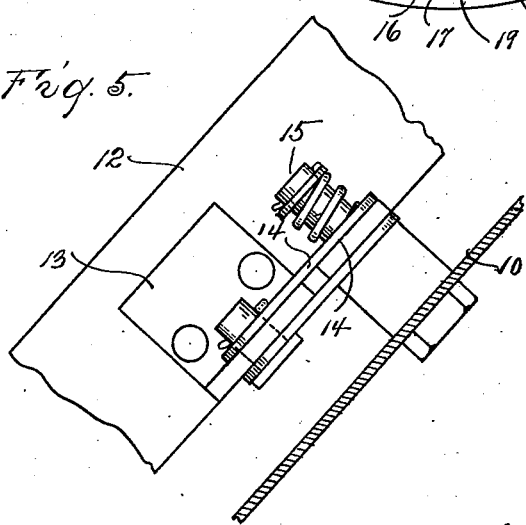

1,712,172

UNITED STATES PATENT OFFICE.

CHARLES A. SAWTELLE, OF DETROIT, MICHIGAN, ASSIGNOR TO PERFECTION ENGINEERING COMPANY, OF DETROIT, MICHIGAN, A CORPORATION OF MICHIGAN.

VEHICLE BRAKE.

Application filed March 10, 1924. Serial No. 698,322.

This invention relates to vehicle brakes and relates particularly to brakes for the front wheels of motor vehicles.

The invention seeks to effect a substantial equalization of the braking pressure acting throughout the opposed friction faces of a brake and further seeks to accomplish this result without grabbing, chattering or backlashing.

A further feature of the invention is a provision for an automatic release of the front wheel brakes proportionate to the steering movement of the front wheels in case such movement is applied while the brakes are on and also to decrease response of the front wheel brakes to an actuating effort in proportion to the turning of the front wheels.

The employment of a brake band arranged within a brake drum and normally disengaged from said drum by its own resiliency is another feature of the invention.

It is an object, furthermore, to provide adjustment means for taking up wear in the lining of said brake band or an equivalent member, which adjustment will be entirely exterior of the brake drum and consequently readily accessible.

A mounting of the rock shaft which carries the cam element of the brake mechanism universally upon the axle is another feature of the construction.

In the drawings:—

Figure 1 is an axial vertical sectional view of the improved mechanism showing a portion of the associated wheel and axle;

Figure 2 is a vertical section taken on line 2—2 of Figure 1;

Figure 3 is a plan view of the mechanism shown in Figure 1;

Figure 4 is a cross section on line 4—4 of Figure 1 showing the universal mounting of the cam shaft;

Figure 5 is a cross section on line 5—5 of Figure 2 showing a support for the brake band;

Figure 6 is a cross sectional detail on line 6—6 of Figure 3 showing the common clamping connection and relative adjustment means for the two-part brake-actuating rock-shaft.

Figure 7 is a fragmentary sectional view taken substantially on the plane indicated by line 7—7 in Figure 1.

In these views the reference character 1 designates the front axle of a motor vehicle and 2 is one of the ground wheels mounting said axle. Said wheel is adapted to swivel upon the axle 1 for steering purposes, following general practice, by forming the axle terminally with a bearing 3 arranged between spaced upper and lower bearings 4 integral with a spindle 5 whereon said wheel is journaled, the bearings 3 and 4 being connected by a substantially vertical king pin 6. It is preferred to form as an integral unit the spindle 5, a circular head 7 from which said spindle centrally projects, and the bearings 4 which are carried by the upper and lower portions of the head 7. 8 is a brake drum rigidly secured to the wheel 2 by bolts 9 or other suitable fastenings. A sheet metal plate 10 rigidly secured to the head 7 by bolts 11 serves as a closure for the brake drum and further carries a brake band 12 and certain actuating parts for the same. The band 12, which has the customary lining 12' of fabric or other suitable material, is of a resilient nature and is normally retracted from engagement with the drum 8 by its own resiliency. The ends of said band approach each other within the lower portion of the drum, the circumferential extent of the band being only slightly less than 360°. The upper portion of the band is supported and guided at two points, approximately 120° removed from each other and from the extremities of said band. Each supporting and guiding device comprises a bracket 13 rigidly secured to the band and a pair of links 14 pivotally connected at corresponding ends to said bracket and pivotally mounted at their other ends upon a bolt 15 mounted fast upon the plate 10. The positioning of the links 14 is such as to provide for the same movement of the portions of the band to which said links are connected as said portions tend to undergo when actuated to engage the drum 8 or when contracted to clear said drum. The adjacent lower ends of the band 12 are pivoted at 16 to down-turned arms of bell cranks 17 intermediately pivoted upon bolts 18 rigidly carried by the plate 10, said bell cranks also having arms projecting toward each other and pivotally connected as indicated at 19. Upon the pin 19, which connects the two bell cranks, there is journaled a roller 20 above which extends an end portion of a two-part rock shaft 21, 22 upon which end portion is fast a cam 23 bearing upon said roller. The shaft 21, 22 is transverse to the king pin 6, the part 21 of said shaft extending beneath the axle 1, and the part 22 being forwardly offset relative to the part 21 adapting it to extend in front of the axle 1, as is best seen in Figure 3. The inner end of the shaft part 22 is formed with an integral upturned actuating arm 24 and is further formed with an integral rearwardly projecting supporting arm 25. The arm 25 projects through an opening 26 in the front face of the axle 1 and carries a ball head 26$^a$ engaging the spherically rounded bottom of the bore 26$^b$ extended into the axle through the top thereof. The upper portion of said bore is closed by a screw threaded plug 26$^c$, the bottom of which is concavely spherical to form a top bearing for the ball 26$^a$. The opening 26 of the axle is of sufficient diameter to admit the ball head 26$^a$ but said ball cannot escape from the bore 26$^b$ through said opening after the plug 26$^c$ is in place, since the latter holds said ball head below a position of registration with said opening. In its proper position of use in the bore 26$^b$ the ball head 26$^a$ is centered in the extended axis of the shaft part 21 so that actuation of the arm 24 rocks the shaft part 21 on its own axis. This universal mounting of the shaft 21, 22 avoids necessity for extreme accuracy in positioning the bearing of said shaft on the axle relative to the brake mechanism in the drum and furthermore provides for a limited angular movement of said shaft in the vertical plane of the axle, which movement is utilized as will hereinafter appear in effecting an automatic relief of braking pressure in case such pressure is applied when the front wheels are undergoing steering movement.

The rock shaft parts 21 and 22 are rigidly engaged and provision is made for a relative adjustment of said parts rotatively to compensate for wear of the brake band linings 12'. Thus, the shaft part 22 is formed with a socket 27 into which the part 21 terminally fits, said socket being split as indicated at 28 (see Figure 6) and having integral lugs 29 at each side of the split, in which lugs a bolt 30 is mounted. Said bolt has an intermediate threaded portion 31 and a reduced threaded end portion 32, the latter being engaged by a clamping nut 33 which, when tightened, draws the lugs 29 toward each other to rigidly clamp the socket 27 upon the shaft part 21. The intermediate threads 31 function similarly to a worm, engaging worm wheel threads 34 cut in the shaft part 31 and extending partially around the same, as best seen in Figure 6. When the clamping nut 33 is loosened a rotative actuation of the bolt 30 acts through the engaged threads 31 and 34 to rotatively shift the shaft part 21 relative to the part 22. When the two shaft parts have been established in their desired relative positions this adjustment is made permanent by tightening the clamping nut 33.

The point of location of the pivots 15 is such that during movement of the brake band no compression is placed in the links 14. In other words, the points 15 do not constitute the anchors for taking the reaction of the brake thrust, this reaction taking place entirely at the bell crank pivots 18. Thus, the links 14 merely center or guide the brake during the operation thereof and throughout the wear of the brake, but do not permit wedging of the brake band against the drum.

Furthermore, by tying together the ends of the bell cranks 17 as at 19, anchoring at each pivot 18 is assured for both directions or rotation of the brake drum. Further, the tying together of these ends so controls the band that the unwrapping force counteracts the wrapping force on the other side of the band for either direction of rotation of the drum, thus eliminating the heretofore objectionable tendency for the brake to grab.

The pivotal supports 18 for the bell cranks 17 are so positioned with reference to the ends of the brake band 12 or in other words to the points of pivotal connection with the brake band ends and also so spaced with reference to the inner surface of the brake drum that the ends of these levers describe arcs and consequently so move the ends of the brake band as to cause a uniform radial movement of the brake band throughout its length. In other words the movement imparted to the ends of the brake band moves the brake band with a combined radial and circumferential movement which results in the uniform engagement of the band with the brake drum throughout the length of the former. Also the wrapping force counteracts the unwrapping force to maintain the drum engaging means in uniform engagement with the drum, or in other words, the wrapping and unwrapping forces counteract one another so as to provide for a uniform engagement of the drum engaging means throughout its length and to permit actuation of the brake unaffected by these forces.

The provision made by the invention for automatic relief of the brake upon a predetermined steering movement of the wheel 2 comprises a bushing 37 secured rigidly within the lower bearing 4 and having a cammed lower end face 38 which inclines gradually upward from diametrically opposed points 38$^a$, to points 38$^b$ 90° apart from the points 38$^a$ and further comprises a bearing member 39 of inverted U-shape seating upon the rock shaft member 21 and straddling the cam 23, said bearing being positioned by an integral pin 40 journaled in a socket 41 axially opening into the lower portion of the king pin 6, the upper surface 42 of said bearing being cammed conversely to the cam face 38 to engage and coact with the latter. In the position assumed by the parts in straight ahead travel the low points 38ª of the cam face 38 engage the high points of the cam face 42, as is clearly shown in Figure 1.

Considering now the operation of the described invention, when the shaft 21, 22 is actuated rotatively, the cam 23 exerts a downward thrust upon the roller 20 reversely rocking the two bell cranks 17 and actuating the lower ends of the brake band 12 apart to establish braking engagement of said band with the drum. The total retarding force which acts through the brake band upon the drum is determined by the degree of angular actuation of the bell cranks 17 and this is determined by the degree of angular actuation of the rock shaft 21, 22. If the two bell cranks are properly symmetrical with respect to the vertical axis of the drum the brake band 12 will be actuated with perfect uniformity and will enter into braking engagement with the drum at the same time throughout its entire length. In actual practice, however, it might prove difficult to make and install the parts with such accuracy as to insure the desired uniform expansion and contraction of the brake band throughout its length and to insure concentricity of said brake band with the drum. Therefore, the invention engages the brake band at points equidistant from the actuated ends thereof and from each other by the guiding and supporting devices 13, 14, 15, whereby movement of the brake band at such points is restrained to a definite path both for expansion and contraction, said devices further holding the brake band in proper position within the drum when disengaged from the latter and preventing any rattle thereof.

Considering now the automatic relief of braking pressure when the wheel 2 undergoes a predetermined steering movement, it is to be understood that the upward reaction of the cam thrust transmitted from the shaft part 21 to the roller 20 during an application of the brakes is taken care of by the U-bearing 39, which in turn seats through its cam face 42 upon the end face 38 of the bushing 37. A steering actuation of the wheel 2 entails a rocking of the bushing 37 about the king pin 6 (since said bushing is fast in the lower bearing 4) and the resulting travel of the points of engagement 38ª of the cam face 38 upon the cam face 42 permits an upward shifting of the bearing 39 proportionate to the degree of steering actuation of the wheel. That is to say, the thrust bearing 39 is released for upward movement to a degree proportionate to the steering angle through which the wheel 2 turns, and if the cam 23 is stressed against the roller 20 during steering movement of the wheel, said cam is permitted to shift bodily upward under the braking stress by a slight angular turning of the shaft 21, 22 about its universal pivot 26ª. Thus the rocking movement of the bell cranks and the resulting retardation will be decreased as compared to that which would occur in straight ahead travel, this decrease being in a predetermined ratio to the steering movement of the wheel 2.

The advantages of an automatic relief of the front brakes when the corresponding wheels are being turned through any considerable angle are well understood by those familiar with this art and are not thought to require discussion herein.

The primary purpose of the relative rotative adjustment between the rock shaft parts 21 and 22 is to permit of a ready compensation for wear of the brake band lining. When such wear becomes excessive the cam 23 must be slightly advanced rotatively so that the normal angular travel of the rock shaft and cam will apply the proper braking stress. Such angular advance of the cam as may be necessary is quickly obtainable and accurately regulable by rotative adjustment of the bolt 30. It is a feature of the described adjustment means that the same is located completely exterior to the brake drum and is consequently readily accessible.

It is to be noted that the bell cranks 17 establish a tie between the extremities of the brake band, whereby a uniformity of travel of said ends, both in applying and releasing the brake, is assured. Such a connection between the brake ends is desirable in view of the fact that the front portion of a brake drum usually acts with a grabbing effect upon the associated brake band or shoe, because of the fact that the direction of rotation of said portion of the drum is such as to urge engagement therewith. By connecting the front and rear portions of the brake band or its equivalent to compel uniform movement thereof any time lag between engagement of the two shoes with the drum or release thereof is avoided. Utilization of the resiliency of the brake band itself to normally retract said band from its drum engaging position simplifies the construction and reduces the cost of manufacture.

What I claim as my invention is:—

1. In a vehicle brake, a brake drum, means for interiorly frictionally engaging said drum providing adjacent ends, and an actuating means establishing a tie between said ends compelling unison of movement of said ends.

2. In a vehicle brake, a brake drum, means interiorly frictionally engageable with said drum providing adjacent ends, bell cranks having corresponding arms connected to said ends and having their other arms projecting toward each other and operatively connected, pivotal supports for said bell cranks engaging the same at the junctures of their arms, and a mounting for the bell crank pivots stationary with respect to rotation of the drum.

3. In a vehicle brake, a brake drum, a brake band interiorly engageable with said drum, actuating means engaging said band, said means also wholly anchoring the band for both directions of rotation of the drum, and means for guiding the band in its expansion or contraction engaging said band at a point circumferentially spaced from said actuating means.

4. In a vehicle brake, a brake drum, a brake band interiorly engageable with said drum, actuating means engaging said band, said means constituting the sole anchorage for the band for both directions of rotation of the drum, a link pivotally connected to the band to position the same and guide its radial movement, and a pivotal support for said link stationary with respect to rotation of the drum.

5. In a vehicle brake, a brake drum, a brake band interiorly engageable with said drum, and having adjacent ends, actuating means for the band engaging said ends and including instrumentalities providing anchorage for the band for both directions of rotation of the drum, and devices for guiding and supporting the band engaging the latter at points substantially equi-distant from said adjacent ends and from each other.

6. In a vehicle brake, the combination with a brake drum, of a brake member interiorly engageable with said drum, a pair of bell cranks intermediately pivoted within said drum each having one arm engaging adjacent ends of said brake member, a cam actuating the other arms of said bell cranks, said last named arms being tied together to prevent relative rotation of the bell cranks, means for actuating the cam, and supporting means for said brake member and bell crank stationary as regards rotation of said drum.

7. In a vehicle brake the combination with a brake drum, of a brake band interiorly engageable with said drum, a support for said band stationary with respect to rotation of the drum, a pair of intermediately pivoted bell cranks having corresponding arms pivoted to the ends of said brake band and having their other arms operatively connected, and actuating means for said band engaging said bell cranks at their connection.

8. In a vehicle brake, the combination with a vehicle wheel swivelled for steering movement, of frictionally engageable braking members, one of which is rotatively secured to said wheel, an actuating shaft for the other of said braking members, and means for relieving the braking stress upon a predetermined swivel movement of the wheel through a bodily shifting of said shaft reversely to the direction of the brake thrust.

9. In a vehicle brake, the combination with a vehicle wheel swivelled for steering movement, of frictionally engageable braking members, one of which is rotative with the wheel, actuating means for the other of said members centered in the extended swivel steering axis of the wheel and movable along said axis toward the axis of rotation of the wheel upon a predetermined swivel movement of the wheel to relieve braking stress.

10. In a vehicle brake, the combination with a vehicle wheel swivelled for steering movement, of a brake drum carried by said wheel, a brake member interiorly engageable with said drum, a rotative actuating member for said brake member within the drum, a thrust bearing normally maintaining the operative position of said actuating member, and a cam member actuable by swivel steering movement of the wheel normally maintaining the operative position of said thrust bearing and providing for a retraction of said bearing and of the actuating member from said position upon a predetermined swivel movement of the wheel.

11. In a vehicle brake, the combination with a vehicle wheel, and a brake drum carried thereby, of a brake member interiorly engageable with said drum, a rotative actuating member for said brake member within the drum centered substantially in the extended axis of swivel steering movement of the wheel, and a member swivelly actuable in unison with the wheel receiving the reaction thrust of said actuating member and providing for a yielding of said member toward the axis of rotation of the wheel proportionate to the swivel travel of the wheel.

12. In a vehicle brake, the combination with a vehicle wheel, and a king pin mounting said wheel for a swivel steering movement, of a brake drum secured to the wheel, a brake member engageable with said drum, a rotative actuating member for said brake member centered in the extended axis of said king pin, a bearing engaging said actuating member taking the reaction to the braking thrust, said bearing being swivelled axially of the king pin in the latter, and a member swivelly movable with the wheel but stationary as regards rotation of the wheel on its axis, engaging said bearing and providing for a yielding of the bearing toward said axis, upon swivel steering movement of the wheel, proportionate to such movement to automatically relieve braking stress.

13. In a vehicle brake, a brake drum, means for peripherally frictionally engaging said drum providing adjacent ends and an actuating means for said adjacent ends controlling the said drum engaging means whereby the unwrapping force counteracts the wrapping force when the brake is applied.

14. In a vehicle brake, a brake drum, means for peripherally frictionally engaging said drum providing adjacent ends and an actuating means for establishing a tie between said adjacent ends and wholly anchoring the first said means for either direction of rotation of the drum, said actuating means having provision for controlling the said drum engaging means whereby the wrapping force counteracts the unwrapping force and vice-versa when the brake is applied.

15. In a vehicle brake, the combination with a wheel swivelled for steering movement, of a brake drum carried by said wheel, a member frictionally engageable with said drum, an actuating shaft for said member, and means for relieving the braking stress upon a predetermined swivel movement of the wheel through a bodily shifting of said shaft reversely to the direction of the brake thrust.

16. In a vehicle brake, a brake drum, a brake band interiorly frictionally engageable with said drum providing adjacent ends, bell cranks having corresponding arms connected to said ends and having their other arms projecting toward each other and pivotally connected, means for reversely rocking said bell cranks for moving the lower ends of said band apart to establish braking engagement of said band with the drum, the pivotal connection between the bell cranks so controlling the band that the unwrapping force neutralizes the wrapping force of the band.

17. A brake mechanism comprising a drum and a plate at one end thereof, a flexible internal brake band adapted to be expanded against said drum, a pair of levers pivoted intermediate their ends on said plate and each having an arm connected to and supporting a free end of said band, the pivots of said levers being separated a greater distance than the points of connection of their arms to said band, the other arms of said levers extending toward each other, said levers being so arranged as to cause the band to expand when said other arms are moved outwardly, and means to move said last mentioned lever arms outwardly.

In testimony whereof I affix my signature.

CHARLES A. SAWTELLE.